Nov. 5, 1963　　　F. HARTWIG ETAL　　　3,109,949
DRIVE UNIT FOR HOUSEHOLD AND KITCHEN ATTACHMENTS
Filed June 12, 1961　　　　　　　　　　3 Sheets-Sheet 1

Inventors:
Fritz Hartwig, Anton Kaspar,
Lothar Kiesow & Hasso Gehrmann
by: George H. Spencer
　　　　　Attorney Nov. 5, 1963   F. HARTWIG ETAL   3,109,949
DRIVE UNIT FOR HOUSEHOLD AND KITCHEN ATTACHMENTS
Filed June 12, 1961   3 Sheets-Sheet 3

Inventors
Fritz Hartwig, Anton Kaspar,
Lothar Kiesow & Hasso Gehrmann
by: George H. Spencer
Attorney United States Patent Office 3,109,949
Patented Nov. 5, 1963

3,109,949
DRIVE UNIT FOR HOUSEHOLD AND KITCHEN ATTACHMENTS
Fritz Hartwig, Anton Kaspar, and Lothar Kiesow, Oldenburg in Oldenburg, Germany, and Hasso Gehrmann, Bregenz, Austria, assignors to Licentia-Patent-Verwaltungs-G.m.b.H., Frankfurt am Main, Germany
Filed June 12, 1961, Ser. No. 116,395
Claims priority, application Germany June 14, 1960
15 Claims. (Cl. 310—68)

The present invention relates to a drive unit.

More particularly, the present invention relates to a drive unit for use with any one of a plurality of different types of small, exchangeable kitchen and household attachments, the unit being provided with a plurality of drive shafts to which the individual attachments, such as comminuting devices, blenders, choppers, slicers, mixers, stirrers, kneading devices, juice extractors, mincers, grinders, knife sharpeners, and the like, may be connected.

There exist two basic types of drive units. In one of these types, the motor is built into a box-like housing, which may be provided with a handle. A number of drive shafts project out of the housing in various directions, these drive shafts being connected to the motor by way of driving gears of different transmission ratios, the overall arrangement being such that each attachment may be connected to an appropriate driving shaft, depending on the speed with which the attachment is to be driven and/or the position of the attachment.

In the other type of drive unit, the motor is mounted on the side of a base plate and has its axis oriented in vertical direction. Some of the attachments are set on the motor, and others on the free portion of the plate, and in the latter case, the power transmission from the motor to the attachment is effected by way of a transmission system mounted on the motor, or by way of a transmission built into the base plate, or by a combination of the two. In this type of arrangement, the motor has basically but two drives and is generally a universal motor which can be switched to operate at at least two or three different speeds, there being appropriate switch means which allow the motor to be put into the desired operation. Various modifications of this type are also known, in which not the base plate but an upper housing is the component which carries the attachment.

The disadvantage of the first-discussed type is that the assembly does not stand very sturdily, due to the relatively great height as compared to the available support offered by the base plate. Furthermore, there is a relatively great likelihood of connecting any given attachment to a drive shaft other than the one to which it is supposed to be connected. Additionally, the arrangement on the whole is complicated and requires many parts. The disadvantage of the other type is also the high overall structural configuration, the fact that the entire assembly occupies a substantial amount of space, and also the fact that it is very difficult to build the assembly into kitchen counters and other furniture.

It is, therefore, an object of the present invention to provide a drive unit arrangement which overcomes the above disadvantages, and with this object in view, the present invention resides mainly in a drive unit for use with household and kitchen attachments and adapted to drive a connected attachment at any one of a plurality of different speeds, which drive unit comprises a motor that is so oriented that its minimum dimension extends in vertical direction, there being a plurality of attachment driving means all of which are arranged on the upper side of the unit.

Additional objects and advantages of the present invention will become apparent upon consideration of the following description when taken in conjunction with the accompanying drawings in which.

Figure 1:
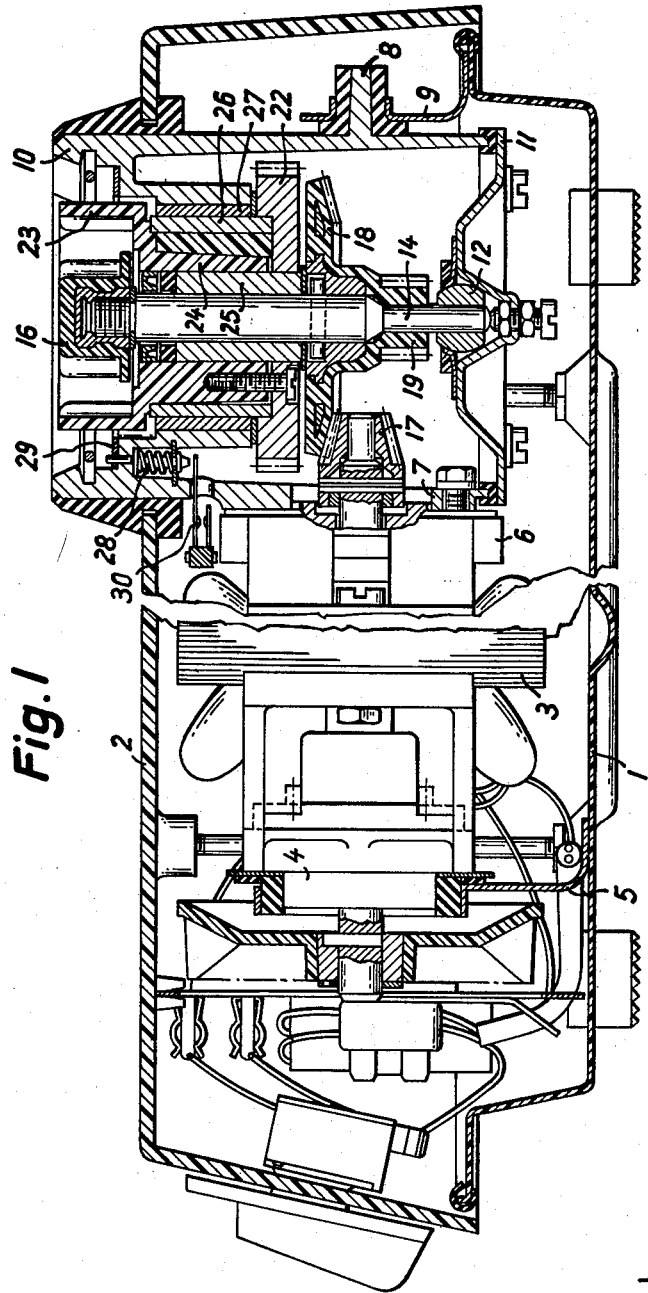
FIGURE 1 is a side elevational view, partly in section, of an arrangement according to the present invention.
Figure 2:
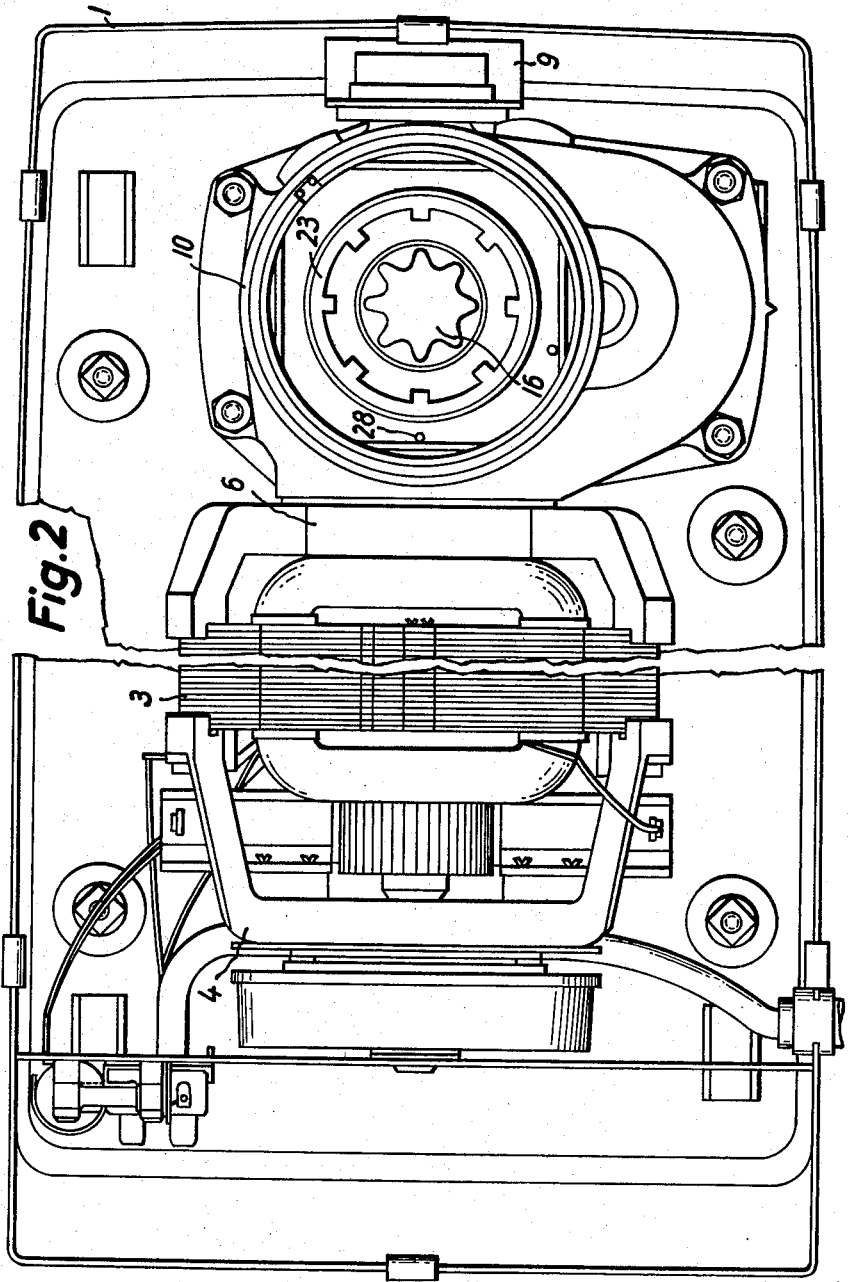
FIGURE 2 is a plan view showing the main features, the hood having been removed to permit clarity of illustration.
Figure 3:
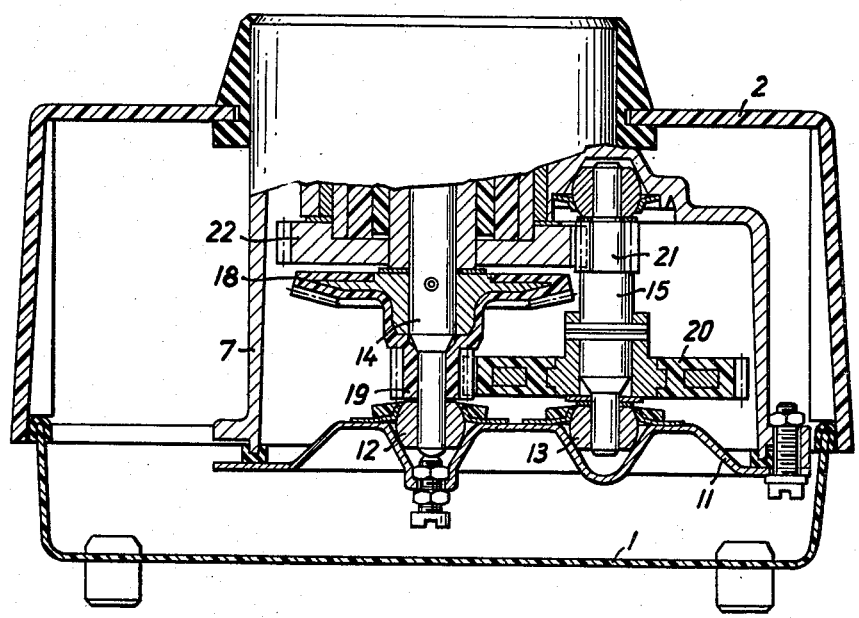
FIGURE 3 is a side elevational view taken in a plane at right angles with that of FIGURE 1.

Referring now to the drawings, the same show a drive unit arrangement comprising a tub-shaped base plate 1 which is covered by a hood 2. A motor 3 has at its left end a bearing bracket 4 which is resiliently supported by a yoke 5 so as to afford a vibration and shock damping mounting, the right end of the motor 3 carrying a bearing bracket 6 which is supported by the drive housing 7, the latter being formed with a web 8 which is likewise mounted in a yoke 9 in such a manner that vibrations are damped out. The bearing bracket 6 is thus part of the drive housing 7. Accordingly, the motor 3 forms together with the drive housing 7 a structural unit which is carried by two bearings, namely, the yokes 5 and 9, and is thus supported in or on the tub-shaped base plate 1 in such a manner that shock and vibrations will be damped.

The motor 3 is a universal-type motor, having a laminated stator formed with flattened sides, and is oriented, as shown, in a generally horizontal direction such that the flattened stator sides are horizontal as well, so that the minimum dimension of the motor extends in vertical direction. The motor 3 thus has a generally low, box-like form which allows either of the drive shaft ends to be used.

The upper part 10 of the drive housing is fashioned as a mounting socket for receiving the attachment to be coupled to the motor and serves as the upper bearing of the two concentric drives. The bottom 11 of the drive housing is conically recessed and supports the bearings 12, 13 of the drive shafts 14, 15. The drive shaft 14 is the drive shaft of the inner one of the two concentric drives and carries at its upper end the coupling member 16 which is shaped so as to mate with a complementarily shaped coupling member of an attachment (not shown) placed in socket 10 and intended to be driven by the inner one of the concentric drives. The driving action of the motor 3 is transmitted from the bevel pinion 17 carried by the motor shaft to the bevel gear 18 which is fixedly mounted on the shaft 14. The hub of the gear 18 is fashioned as a pinion 19 which drives a gear 20 carried by the drive shaft 15, the latter carrying a pinion 21 which is in mesh with a gear 22 that is screwed to the coupling member 23 of the outer one of the two drives. This coupling member 23 is shaped so as to mate with a different attachment which is placed in socket 10 and which is intended to be driven by the outer one of the two drives. Bearing sleeves 25 and 26 made of sintered metal are seated on a cylindrical boss portion 24 of the coupling member 23. The outer bearing for the two concentric drives is constituted by a steel bushing 27 which is inserted into the upper housing portion 10.

It will be appreciated that the two coupling members 16 and 23 will both be driven from the motor 3, but will rotate at different speeds. Thus, each attachment to be used with the drive unit will have a coupling member corresponding to the shape of either of the coupling members 16, 23, as desired.

In order to make possible further speed control, a switching pin 28 is set into the upper part of the drive housing, the upper end of this pin 28 projecting upwardly through the bottom 29 of the part which serves as the socket. When the pin 28 is depressed as the result of a particular attachment being placed onto the drive unit, the switch contacts 30 are actuated and the motor 3 is set to rotate at a different speed.

If the drive ratio is to be changed mechanically, a second set of gears 17, 18, may be provided, so that the motor shaft will carry an additional pinion 17 which cooperates with an additional gear 18 carried by the drive shaft 14, this additional gear 18 being of larger diameter than the first gear 18. The two gears 18 can be integral with each other, while each of the two pinions 17 is mounted on the motor shaft so as to be freely rotatable relative thereto, there being two electrically actuated clutches by means of which either one of the two pinions can be non-rotatably connected to the motor shaft, as desired. The switch 30 actuated by the pin 28 can then be used to energize the clutch associated with the appropriate pinion 17.

It will be appreciated that by virtue of the above-described construction, there will be at least two attachment driving means associated with a socket that is adapted to receive attachments, the arrangement, in its simplest form, comprising only two such concentric driving means. The speed of the motor may then be adjusted by the appropriate intercoupling between the drive unit and the attachments. Furthermore, the switching pin arrangement may be modified to include an additional set of contacts for interrupting the motor supply line if no attachment is on the socket. The pin then has two positions, in one of which the interruption in the supply line is closed, so that the motor can be turned on, and in the other of which position the rotational speed can be changed.

By selecting appropriate rotational speed settings and appropriate mechanical transmission ratios one r.p.m. change-over setting, or one mechanical transmission ratio change-over, will suffice to produce four r.p.m. ranges which will generally be enough for all attachments. Furthermore, the above-described unit makes it possible, without providing any additional structural components, to operate an attachment incorporating different parts driven at different speeds, as, for example, a kneading or stirring attachment in which the kneading or stirring implement is rotated at one speed and the receptacle containing the substance being kneaded or stirred is rotated at another speed.

According to another feature of the present invention, the switching pin which responds to the attachment being placed into the socket can be used for an interlock, either at the power switch or in the speed change-over or transmission change-over switch such that for any given attachment the motor will operate only at the speed or speeds at which the particular attachment is intended to be driven. For example, it will generally be desired to drive a stirrer-type attachment only at either 150 or 250 r.p.m., while a kneader will want to be driven only at either 80 or 150 r.p.m. Such an interlock arrangement can readily be obtained by means of a multiple switch system equipped with insertable switching templates. Under certain circumstances, more than one switching pin may be provided, suitable means being provided so that the attachment will actuate only one of these pins, or only certain ones thereof. The present invention is thus not limited to the illustrated embodiment in which there is one socket adapted to receive attachments to be driven by either one of but two concentric drives, and in which two drive speeds are available thus making it possible to drive an attachment at any one of four different speeds.

It will be understood that the above description of the present invention is susceptible to various modifications, changes, and adaptations, and the same are intended to be comprehended within the meaning and range of equivalents of the appended claims.

What is claimed is:

1. A device of the character described comprising, in combination: a generally block-shaped drive unit having at its upper side a socket for receiving any one of a plurality of attachments, the maximum dimension of said generally block-shaped drive unit extending in horizontal direction; a plurality of concentric attachment driving means, each being operative for driving a particular attachment received by said socket; a motor built into said drive unit; and means interconnecting said motor with said attachment driving means.

2. A drive unit for use with household and kitchen attachments, said unit comprising, in combination: a motor so oriented that its minimum dimension extends in vertical direction; at least two concentric attachment driving means arranged on the upper side of the unit; means interconnecting said motor with said attachment driving means for driving the latter at different speeds; and means forming a socket for receiving an attachment to be driven by one of said attachment driving means.

3. A drive unit is defined in claim 2, further comprising control means associated with said socket and actuatable upon the placing of an attachment onto said socket for setting the speed at which such attachment is to be driven.

4. A drive unit as defined in claim 3 wherein said control means comprise switching means in circuit with said motor for determining the rotational speed setting of said motor.

5. A drive unit for use with household and kitchen attachments, said unit comprising, in combination: a motor so oriented that its minimum dimension extends in vertical direction; two attachment driving means concentrically arranged on the upper side of the unit; means interconnecting said motor with said attachment driving means for driving the latter at different speeds; means forming a socket for receiving an attachment to be driven by either of said two attachment driving means; and switch means associated with said socket and actuatable upon the placing of an attachment onto said socket for setting the speed at which such attachment is to be driven.

6. A drive unit as defined in claim 5 wherein said switch means include means for turning said motor on when an attachment is placed onto said socket.

7. A drive unit for use with household and kitchen attachments, said unit comprising, in combination: a motor so oriented that its minimum dimension extends in vertical direction; at least two attachment driving means arranged on the upper side of the unit; means interconnecting said motor with said attachment driving means for driving the latter at different speeds; means forming a housing for said attachment driving means, said housing means and said motor constituting a single structural entity; and means for mounting said entity on a base plate in such a manner that vibrations are damped.

8. A drive unit as defined in claim 7 wherein said base plate is tub-shaped.

9. A drive unit as defined in claim 7 wherein said motor includes a bearing bracket which is part of said housing means.

10. A drive unit as defined in claim 7, further comprising transmission means between said motor and a drive shaft associated with said attachment driving means, said transmission means including a pinion on the shaft of said motor and a gear in mesh with said pinion and mounted on said driving shaft, the latter having at its upper end a coupling member adapted to engage a mating coupling member of an attachment which is to be driven by the inner one of said attachment driving means.

11. A drive unit as defined in claim 10 wherein said transmission means include an additional pinion on said motor shaft and an additional gear on said driving shaft, each of said pinions being mounted on said motor shaft for free rotation relative thereto, and clutch means for non-rotatably connecting either of said pinions to said motor shaft, as desired.

12. A drive unit as defined in claim 2 wherein said socket means are part of a housing for said attachment driving means.

13. A drive unit as defined in claim 2, further comprising switch pin means associated with said socket and adapted to be actuated by an attachment received by said socket for causing the attachment driving means which drives the respective attachment to do so at a particular speed intended for such attachment.

14. A drive unit as defined in claim 13 wherein said switch pin means comprise a multiple switch arrangement, and a switching template carried by the attachment for actuating those of said switches as will cause said attachment to be driven at the desired speed.

15. A drive unit as defined in claim 14 wherein said multiple switch arrangement comprises a plurality of switching pins.

References Cited in the file of this patent
UNITED STATES PATENTS

| | | |
|---|---|---|
| 2,984,461 | Butler et al. | May 16, 1961 |
| 2,272,125 | Loone | Feb. 3, 1942 |